(12) United States Patent
Jin

(10) Patent No.: US 10,558,872 B2
(45) Date of Patent: Feb. 11, 2020

(54) LOCALIZATION BY VISION

(71) Applicant: VEONEER US INC., Southfield, MI (US)

(72) Inventor: Jin Jin, Lake Orion, MI (US)

(73) Assignees: VEONEER US INC., Southfield, MI (US); ZENUITY, Göteborg (SE)

( * ) Notice: Subject to any disclaimer, the term of this patent is extended or adjusted under 35 U.S.C. 154(b) by 39 days.

(21) Appl. No.: 15/933,472

(22) Filed: Mar. 23, 2018

(65) Prior Publication Data

US 2019/0294898 A1    Sep. 26, 2019

(51) Int. Cl.
| | |
|---|---|
| G06K 9/00 | (2006.01) |
| G08G 1/01 | (2006.01) |
| B60R 11/04 | (2006.01) |
| G06K 19/06 | (2006.01) |
| G05D 1/00 | (2006.01) |
| G08G 1/07 | (2006.01) |
| B60W 40/02 | (2006.01) |
| G01S 5/16 | (2006.01) |
| G01C 21/28 | (2006.01) |
| G01S 1/70 | (2006.01) |

(52) U.S. Cl.
CPC .......... *G06K 9/00818* (2013.01); *B60R 11/04* (2013.01); *B60W 40/02* (2013.01); *G01S 5/16* (2013.01); *G05D 1/0088* (2013.01); *G06K 9/00798* (2013.01); *G06K 19/06037* (2013.01); *G08G 1/0116* (2013.01); *G08G 1/07* (2013.01); *B60R 2300/103* (2013.01); *G01C 21/28* (2013.01); *G01S 1/70* (2013.01); *G05D 2201/0213* (2013.01); *G06K 2209/27* (2013.01)

(58) Field of Classification Search
CPC ......... G06K 9/00818; G06K 19/06037; G06K 9/00798; G05D 1/0088; G05D 2201/0213; G08G 1/0116; B60R 11/04; B60R 2300/103
See application file for complete search history.

(56) References Cited

U.S. PATENT DOCUMENTS

| | | | |
|---|---|---|---|
| 2009/0228204 A1 | 9/2009 | Zavoli et al. | 701/208 |
| 2010/0315200 A1* | 12/2010 | Warrier | G06F 21/305 340/5.51 |
| 2014/0105090 A1 | 4/2014 | Schultz et al. | 356/141.5 |
| 2015/0185735 A1 | 7/2015 | Liang | |
| 2015/0219437 A1 | 8/2015 | Dowski et al. | |
| 2018/0045516 A1* | 2/2018 | Sumizawa | G01C 21/28 |

(Continued)

FOREIGN PATENT DOCUMENTS

| | | | |
|---|---|---|---|
| DE | 102017006616 A1 | 7/2017 | G05D 1/02 |
| EP | 3421936 A1 | 6/2017 | G01C 21/26 |
| WO | WO2009/098319 A2 | 8/2009 | |

*Primary Examiner* — Qian Yang
(74) *Attorney, Agent, or Firm* — Christopher P. Maiorana, PC

(57) ABSTRACT

A system having an encoded data set and a sensor. The encoded data set may be configured to store a plurality of information relating to a surrounding area. The encoded data set is presented in a vision sensor readable format along with human readable information on an infrastructure element. The sensor may be configured to (i) locate the encoded data set and (ii) calculate a distance to the road sign based on the information relating to the surrounding area. The distance is used to provide localization in an autonomous vehicle application.

18 Claims, 6 Drawing Sheets

(56) References Cited

U.S. PATENT DOCUMENTS

2018/0328741 A1* 11/2018 Pratt ....................... G01S 7/412
2019/0152477 A1* 5/2019 Salter .................. B60W 30/143
2019/0163197 A1* 5/2019 Qiao ...................... G01C 21/00
2019/0205672 A1* 7/2019 Stephan ............. G06K 9/00805

* cited by examiner

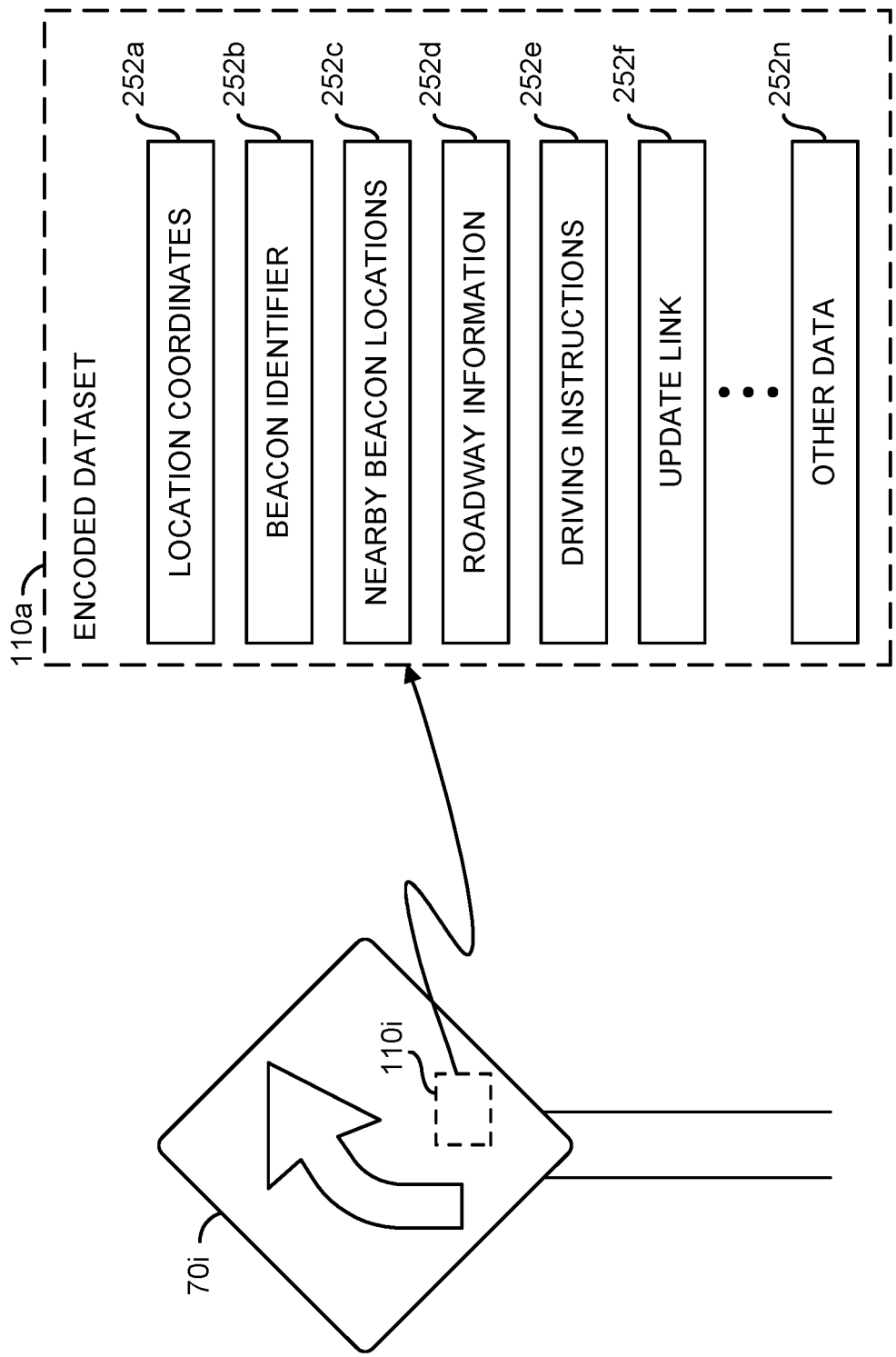

LOCALIZATION BY VISION

FIELD OF THE INVENTION

The invention relates to determining location generally and, more particularly, to a method and/or apparatus for implementing localization by using a vision sensor to read road signs that provide structured data.

BACKGROUND

Currently, the host vehicle localization in Autonomous Driving field is done by Lidar/Camera with high definition 3D map data. The cost of this localization approach is relatively high and the localization algorithm has to process many uncertainties regarding changes to the environment.

It would be desirable to implement localization by using a vision sensor to read road signs that provide structured data.

SUMMARY

The invention concerns a system having an encoded data set and a sensor. The encoded data set may be configured to store a plurality of information relating to a surrounding area. The encoded data set is presented in a vision sensor readable format along with human readable information on an infrastructure element. The sensor may be configured to (i) locate the encoded data set and (ii) calculate a distance to the road sign based on the information relating to the surrounding area. The distance is used to provide localization in an autonomous vehicle application.

BRIEF DESCRIPTION OF THE FIGURES

Embodiments of the invention will be apparent from the following detailed description and the appended claims and drawings in which:

FIG. 6 is a diagram of an encoded data set.

DETAILED DESCRIPTION OF THE EMBODIMENTS

Embodiments of the present invention include providing localization that may (i) implement a vision sensor, (ii) provide a structured data set, (iii) supplement a standalone road sign, (iv) be placed along with other infrastructure elements and/or (v) be cost effective to implement.

Figure 1:
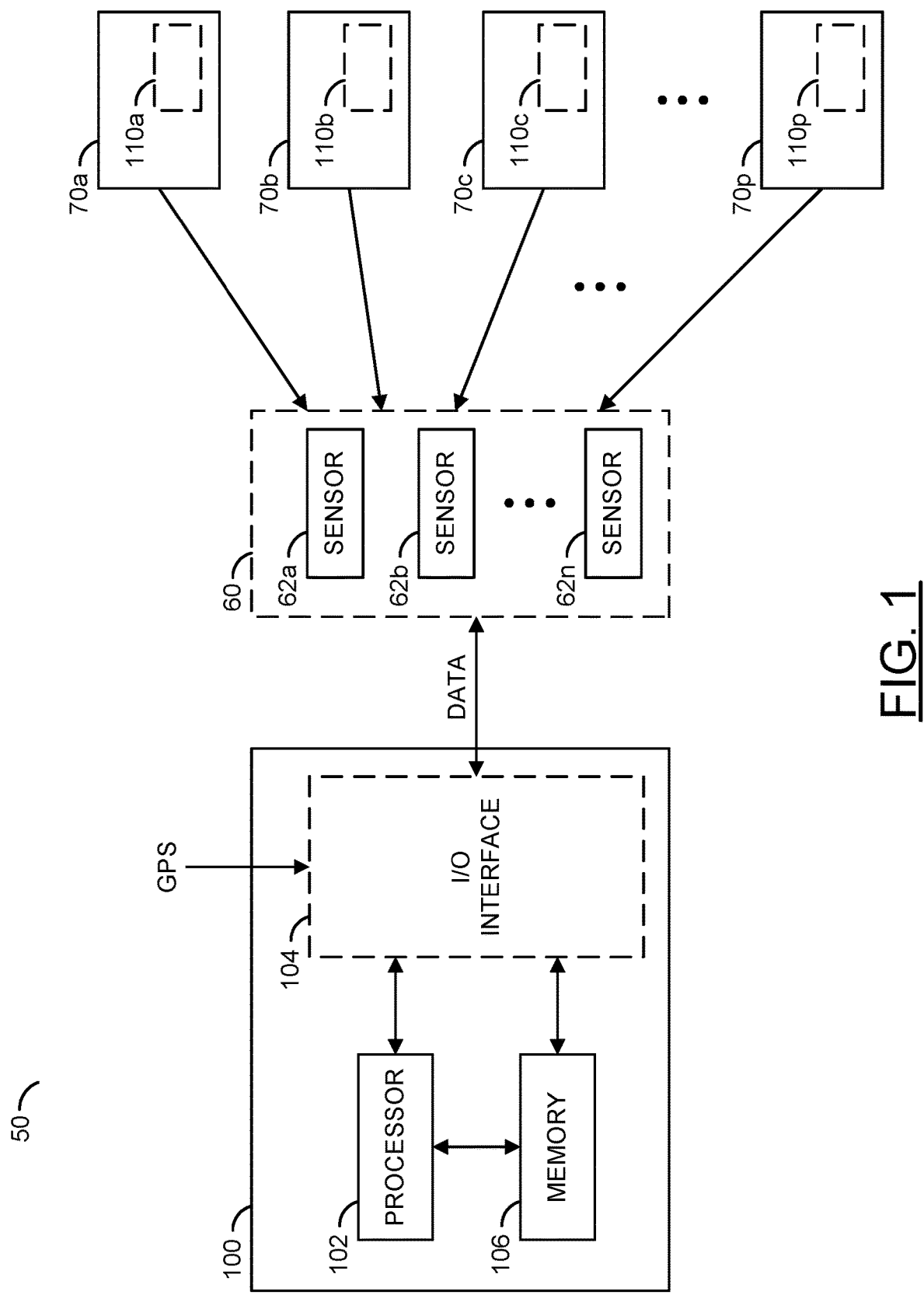
FIG. 1 is a diagram of an example embodiment of the present invention.

Referring to FIG. 1, a block diagram illustrating an example embodiment of the invention is shown. A system 50 is shown. The system 50 may be implemented as part of and/or installed within a vehicle (e.g., a car, a truck, a bicycle, an airplane, etc.). In an example, the system 50 may be implemented as components of a vehicle. In one example, the system 50 may be installed in a vehicle at a time of manufacturing. In another example, the system 50 may be installed as an after-market product in a vehicle. The implementation of the system 50 may be varied according to the design criteria of a particular implementation.

The system 50 may comprise a block (or circuit) 60 and/or a block (or circuit) 100. The block 60 may implement a sensor block. The circuit 100 may implement an apparatus (e.g., a device, a circuit, a module, an example embodiment of the invention, etc.). The system 50 may comprise other components (not shown). The number, type and/or arrangement of the system 50 may be varied according to the design criteria of a particular implementation.

The apparatus 100 may comprise a block (or circuit) 102, a block (or circuit) 104 and/or a block (or circuit) 106. The circuit 102 may implement a processor. The circuit 104 may implement an input/output interface. The circuit 106 may implement a memory. Details of the processor 102, the I/O interface 104 and/or the memory 106 may be described in greater detail in association with FIG. 2. The apparatus 100 may comprise other components (not shown). The number, type and/or arrangement of the components of the apparatus 100 may be varied according to the design criteria of a particular implementation.

The sensor block 60 is shown sending/receiving a signal (e.g., DATA). In an example, the signal DATA may comprise data exchanged between the sensor block 60 and the apparatus 100. The signal DATA may comprise data readings from the sensors 62a-62n. In some embodiments, the apparatus 100 may be configured to send information to the sensors 62a-62n via the signal DATA (e.g., calibration data).

The sensor block 60 may comprise a number of blocks (or circuits) 62a-62n. The blocks 62a-62n may each comprise a sensor. The sensors 62a-62n may be configured to detect, read, sense, and/or receive input. In some embodiments, each of the sensors 62a-62n may be configured to detect a different type of input. In some embodiments, each of the sensors 62a-62n may be the same type of sensor. In one example, the sensors 62a-62n may comprise video cameras (e.g., capable of recording video and/or audio). In another example, the sensors 62a-62n may comprise infrared (IR) sensors (e.g., capable of detecting various wavelengths of light). In some embodiments, the sensors 62a-62n may comprise vehicle sensors (e.g., speed sensors, vibration sensors, triaxial sensors, magentometers, temperature sensors, gyroscopes, LIDAR, radar, accelerometers, inertial sensors, etc.). For example, the sensors 62a-62n may be configured to detect acceleration in an X direction (e.g., aX), acceleration an a Y direction (e.g., aY), acceleration an a Z direction (e.g., aZ), a yaw, a pitch and/or and roll. The implementation, type and/or arrangement of the sensors 62a-62n may be varied according to the design criteria of a particular implementation.

The I/O interface 104 may be configured to send/receive input/output. In the example shown, the I/O interface 104 may send/receive the signal DATA. The I/O interface 104 may receive a signal (e.g., GPS). In one example, the signal GPS may be received from one or more GNSS satellites. In another example, the signal GPS may be received from an Advanced Driver Assistance Systems (ADAS) provider.

The signal GPS may provide road characteristics. In some embodiments, the road characteristics may comprise location coordinates (e.g., longitude and latitude). Generally, the road characteristics may comprise more information than location coordinates. The road characteristics may comprise ADAS data for various locations. The road characteristics may comprise altitude, road curvature data, road banking data, landmark information (e.g., information about nearby road signs and/or street lights), sensor readings from previous vehicles that have driven at that location, lane-specific information, etc. Generally, the road characteristics may comprise data usable to predict potential readings from the sensors 62a-62n for a particular location.

A number of infrastructure elements 70a-70p are shown. The infrastructure elements 70a-70p may be implemented as standalone road signs, or signs placed along with other infrastructure elements, such as a building. A number of data sets (or data elements) 110a-110p are shown. The data elements 110a-110p may be implemented as digital encoded markings that includes data. The data elements 110a-110p may be visible on the infrastructure elements 70a-70p. The digitally encoded data elements 110a-110p may be in the form of a bar code, a QR code, or other computer vision readable format. A variety of digital information (to be described in more detail in connection with FIG. 6) may be included in the data sets 110a-110p. The sensors 62a-62n may be implemented as cameras and/or scanners that may be capable of reading the encoded data sets 110a-110p.

Figure 2:
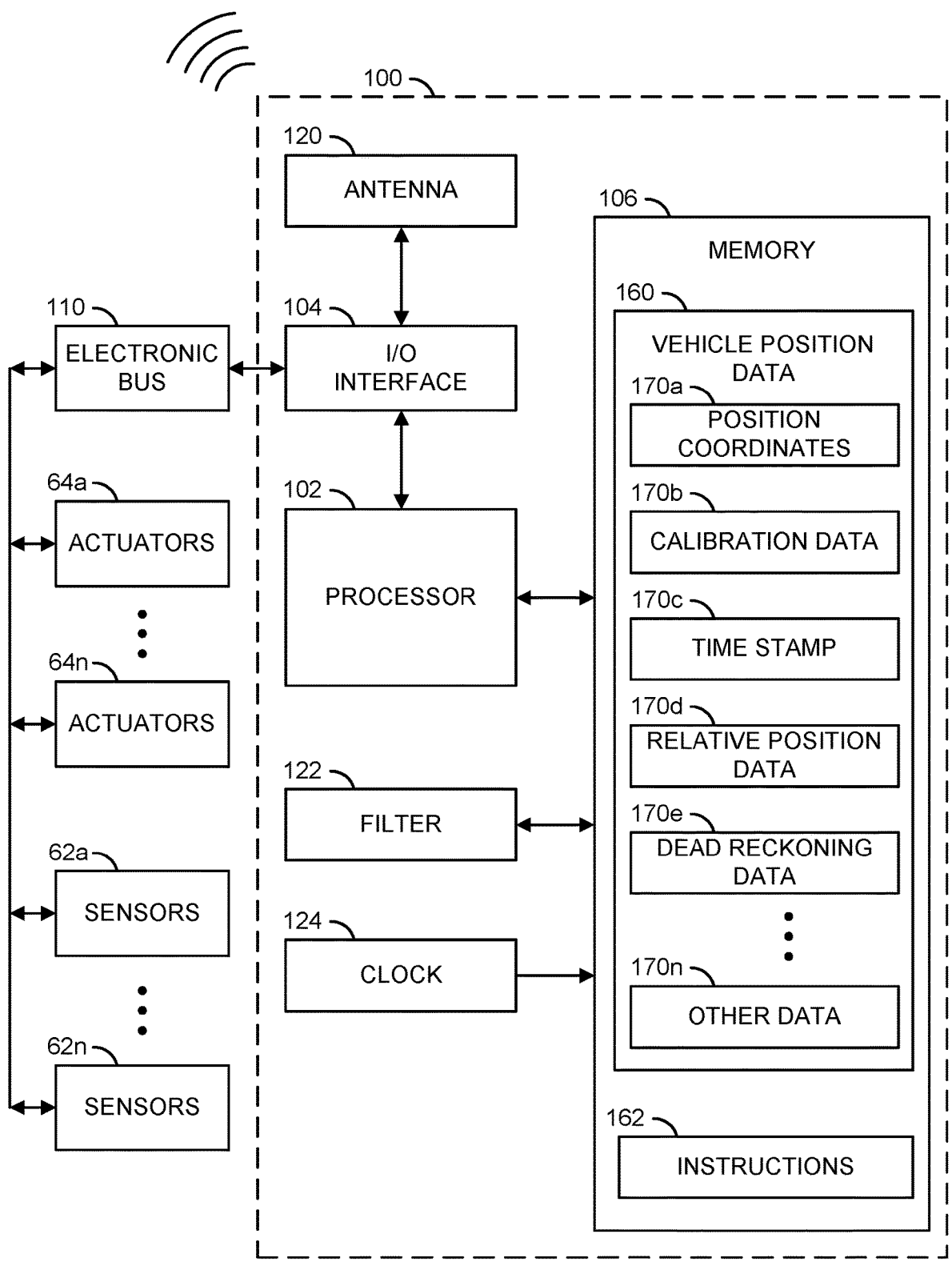
FIG. 2 is a diagram illustrating a module configured to determine localization by light sensors.

Referring to FIG. 2, a diagram illustrating a module configured to determine sensor plausibility using GPS road information is shown. The module 100 may transmit/receive the signal DATA and/or the signal GPS. The module 100 may send/receive other signals (not shown). The number and/or type of signals sent and/or received by the module 100 may be varied according to the design criteria of a particular implementation.

The module 100 may be connected to a block (or circuit) 110. The circuit 110 may implement an electronic bus. The electronic bus 110 may be configured to transfer data between the module 100 and the sensors 62a-62n and/or actuators 64a-64n. In some embodiments, the electronic bus 110 may be implemented as a vehicle CAN bus. The electronic bus 110 may be implemented as an electronic wired network and/or a wireless network. Generally, the electronic bus 110 may connect one or more components of the vehicle 50 to enable a sharing of information in the form of digital signals (e.g., a serial bus, an electronic bus connected by wiring and/or interfaces, a wireless interface, etc.).

The module 100 generally comprises the processor 102, the I/O interface 104, the memory 106, a block (or circuit) 120, a block (or circuit) 122 and/or a block (or circuit) 124. The circuit 120 may implement an antenna. The circuit 122 may implement a filter. The circuit 124 may implement a clock. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to base stations), a GNSS network (e.g., communication satellites) and/or a Wi-Fi network. In another example, the antenna 120 may be implemented as two or more antennas. For example, one antenna may be specifically designed to connect to the base station(s), while another antenna may be implemented to connect to the GNSS network satellites. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 110. The implementation of the antenna 120 may be varied according to the design criteria of a particular implementation.

In some embodiments, the antenna 120 may be implemented as a transceiver configured to communicate (e.g., send and/or receive) data (e.g., radio signals). The transceiver 120 may receive data from the processor 102 to communicate with external devices (e.g., other of the modules 100a-100n). The transceiver 120 may receive communications from external devices (e.g., other of the modules 100a-100n) and transmit the communication signals to the processor 102. The transceiver 102 may be configured to communicate a Basic Safety Message (BSM) protocol and/or data outside the BSM protocol. The transceiver 120 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 120 may be varied according to the design criteria of a particular implementation.

The processor 102 may be implemented as a microcontroller. In an example, an off-board circuit (e.g., a component that is not part of the module 100, such as a distributed and/or scalable computing service) may perform functions of the processor 102. The design of the processor 102 and/or the functionality of various components of the processor 102 may be varied according to the design criteria of a particular implementation. The processor 102 is shown sending data to and/or receiving data from the I/O interface 104 and/or the memory 106.

The memory 106 may comprise a block (or circuit) 160 and a block (or circuit) 162. The block 160 may store vehicle position data and/or sensor data. The block 162 may store computer readable instructions (e.g., instructions readable by the processor 102). The vehicle position data 160 may store various data sets 170a-170n. For example, the data sets 170a-170n may comprise position coordinates 170a, calibration data 170b, time stamp 170c, relative position data 170d, dead reckoning data 170e and/or other data 170n.

The position coordinates 170a may store location information data calculated and/or received by the module 100 from the GNSS satellites. The GNSS satellites may provide data from which a particular resolution of location information positional accuracy may be calculated from the signal GPS. In some embodiments, the position coordinates 170a may not provide sufficient positional accuracy for particular applications (e.g., lane detection, autonomous driving, etc.). In some embodiments, the position coordinates 170a may be calculated by the filter 122 and/or a component external to the module 100.

The calibration data 170b may comprise parameters (e.g., coefficients) used to transform data received from the sensors 62a-62n and/or presented to the actuators 64a-64n. The calibration data 170b may provide many sets of coefficients (e.g., one set of coefficients for each of the sensors 62a-62n and/or the actuators 64a-64n). The calibration data 170b may be updatable. For example, the calibration data 170b may store current values as coefficients for the sensors 62a-62n and/or the actuators 64a-64n and, as the data from the sensors 62a-62n and/or the actuators 64a-64n drifts, the module 100 may update the calibration data 170b in order to maintain accuracy. The format of the calibration data 170b may vary based on the design criteria of a particular implementation.

The time stamp/delay 170c may be used to determine an age of the vehicle position data 160. In one example, the time stamp 170c may be used to determine if the vehicle position data 160 should be considered reliable or unreliable (e.g., data older than a pre-determined threshold amount of time may be unreliable). For example, the time stamp 170c may record a time in Coordinated Universal Time (UTC)

and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may be used to account (e.g., compensate) for the local conditions that may affect an accuracy of the position coordinates 170a. The relative position data 170d may provide higher precision location information than the position coordinates 170a. In some embodiments, the relative position data 170d may store distances and/or angles of the vehicle 50 from one or more of the signs 70a-70p corresponding to the encoded data sets 110a-110p.

The dead reckoning data 170e may be used to store past and/or present information to determine positions traveled by the vehicle 50. For example, the dead reckoning data 170e may store a previously determined position of the vehicle 50 (e.g., estimated speed, estimated time of travel, estimated location, etc.). The previously determined position may be used to help determine a current position of the vehicle 50. In some embodiments, the dead reckoning data 170e may be determined based on data from the sensors 62a-62n of the vehicle 50 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations. In some embodiments, the other data 170n may store time stamp information.

The processor 102 may be configured to execute stored computer readable instructions (e.g., the instructions 162 stored in the memory 106). The processor 102 may perform one or more steps based on the stored instructions 162. In an example, the processor 102 may predict values for the sensors 62a-62n. In another example, one of the steps of the instructions 162 may be executed/performed by the processor 102 and may determine and/or extract the road characteristics from the signal GPS. The instructions executed and/or the order of the instructions 162 performed by the processor 102 may be varied according to the design criteria of a particular implementation.

The communication port 104 may allow the module 100 to communicate with external devices such as the sensors 62a-62n and/or the actuators 64a-64n. For example, the module 100 is shown connected to the external electronic bus 110. The communication port 104 may allow the module 100 to receive information from the sensors 62a-62n of the vehicle 50 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 122 may be configured to perform a linear quadratic estimation. For example, the filter 122 may implement a Kalman filter. Generally, the filter 122 may operate recursively on input data to produce a statistically optimal estimate. For example, the filter 122 may be used to calculate the position coordinates 170a and/or estimate the accuracy of the position coordinates 170a. In some embodiments, the filter 122 may be implemented as a separate module. In some embodiments, the filter 122 may be implemented as part of the memory 106 (e.g., the stored instructions 162). The implementation of the filter 122 may be varied according to the design criteria of a particular implementation.

The clock 124 may be configured to determine and/or track a time. The time determined by the clock 124 may be stored as the time stamp data 170c. In some embodiments, the encoded data 110a-110p detected by the sensors 62a-62n may be may be associated with one of the time stamp data 170c.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. For example, PVT may be considered a bare minimum output for navigation. In some embodiments, the module 100 may calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution.

In some embodiments, the module 100 may use an external processor (e.g., an off-board processor) to perform the calculations and/or perform operations. In one example, the external processor may be implemented as a distributed computing service configured to scale and/or provision resources on demand (e.g., cloud computing). For example, the module 100 may transmit data to the cloud computing service and one or more processors of the cloud computing service may perform the calculations and/or perform operations. The module 100 may receive the calculations from the cloud computing service and store the data in the memory 106. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data. In some embodiments, the instructions 162 may be executed by the processor 102 to provide responses to requests from other components of the vehicle 50. For example, a brake system of the vehicle 50 (e.g., one of the actuators 64a-64n) may request information from the module 100 before performing a particular response (e.g., to slow down).

The sensors 62a-62n may be configured to capture information from the environment surrounding the vehicle 50. The sensors 62a-62n may be vehicle sensors (e.g., speedometer, fluid sensors, temperature sensors, etc.). In some embodiments, data from the sensors 62a-62n may be used to determine the dead reckoning data 170e. In one example, the sensors 62a-62n may be various types of sensors configured to determine vehicle movement (e.g., magnetometers, accelerometers, wheel click sensors, vehicle speed sensors, gyroscopes, etc.). In another example, data from the sensors 62a-62n may be used to determine distances and/or directions traveled from a reference point. The types of sensors 62a-62n implemented may be varied according to the design criteria of a particular implementation. One or more of the sensors 62a-62n may be implemented as camera sensors. The camera sensors 62a-62n may be configured to read the encoded data sets 110a-110p.

The actuators 64a-64n may be components of the vehicle 50 configured to cause an action, move and/or control an aspect of the vehicle 50. For example, the actuators 64a-64n may be one or more of a braking system, a steering system, a lighting system, windshield wipers, a heating/cooling system, etc. In some embodiments, the actuators 64a-64n may be configured to respond to information received from the module 100 and/or the sensors 62a-62n. For example, if one of the actuators 64a-64n is a steering system, the steering system may receive information from the module 100 indicating that a collision with a nearby vehicle is likely and the steering system may respond by causing the vehicle 50 to change direction. The types of actuators 64a-64n implemented may be varied according to the design criteria of a particular implementation.

In some embodiments, the sensors 62a-62n and/or the actuators 64a-64n may be implemented to enable autonomous driving of the vehicle 50. For example, the sensors 62a-62n may receive and/or capture input to provide information about the nearby environment. The information captured by the sensors 62a-62n may be used by components of the vehicle 50 and/or the module 100 to perform calculations and/or make decisions. The calculations and/or decisions may determine what actions the vehicle 50 should take. The actions that the vehicle 50 should take may be converted into signals readable by the actuators 64a-64n. The actuators 64a-64n may cause the vehicle 50 to move and/or respond to the environment. For example, the module 100 may present an output that provides a relative position of the vehicle 50 to other vehicles. Other components may be configured to use the data provided by the module 100 to make appropriate decisions for autonomous driving.

Figure 3:
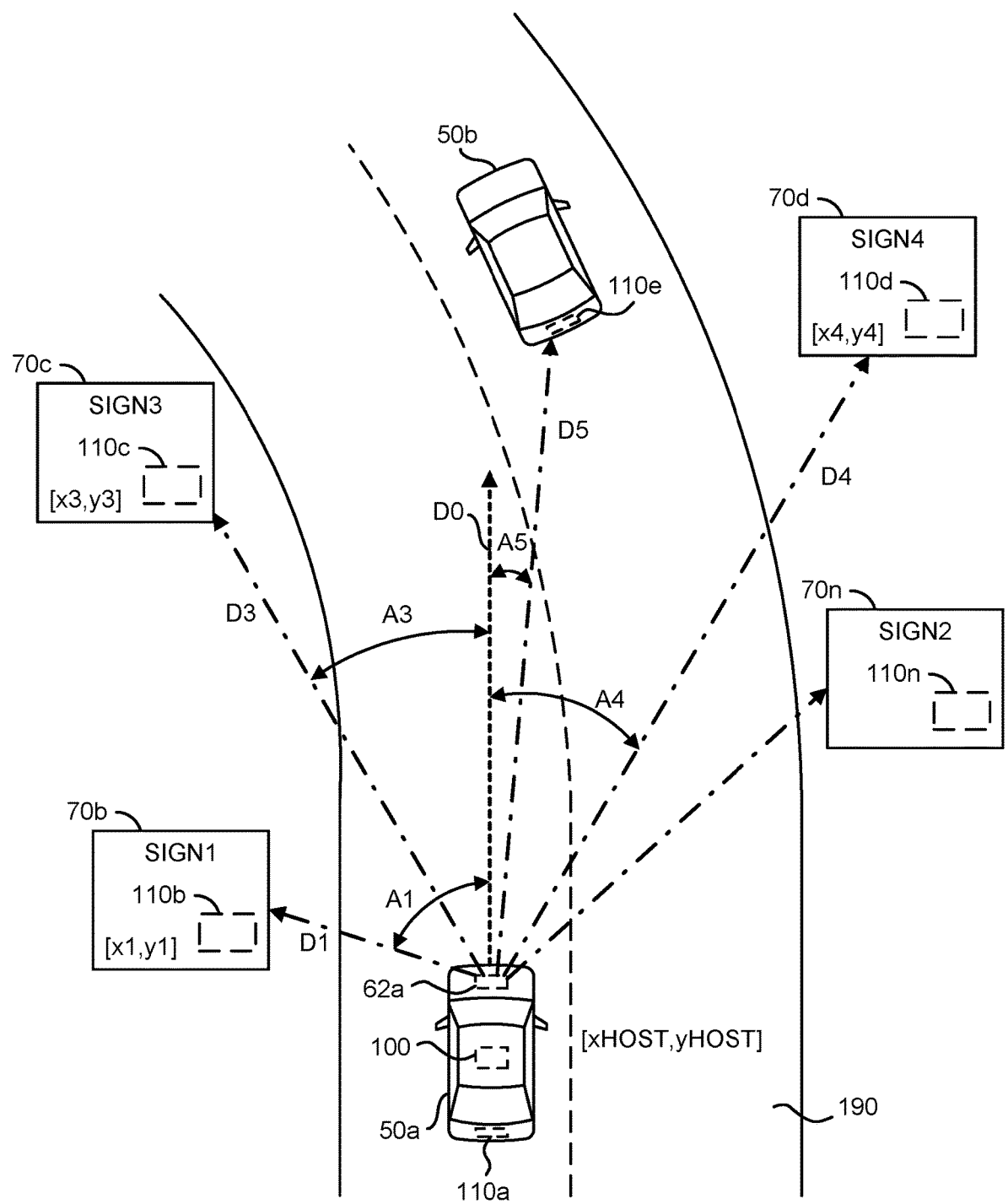
FIG. 3 is a diagram of a top view of a vehicle.

Referring to FIG. 3, a block diagram illustrating a top view of a vehicle 50a and a vehicle 50b is shown. The vehicle 50a and the vehicle 50b are shown moving along a road 190. A number of the infrastructure elements 70b (e.g., SIGN1), 70c (e.g., SIGN3), and 70d (e.g., SIGN4) are shown detected by the vehicle 50a. The infrastructure element 70n is not detected. An arrow (e.g., D0) is shown in the general direction of travel (e.g., line of sight) of the vehicle 50a. Each of the respective infrastructure elements 70b, 70c and 70d are shown with a respective encoded data set 110b, 110c and 110d. An arrow (e.g., D1) is shown between a sensor 62a on the vehicle 50a and the infrastructure element 70b. The arrow D1 represents a polar distance to the element 70b. An arrow (e.g., D3) is shown between the sensor 62 and the infrastructure element 70d. The arrow D3 represents a polar distance to the element 70c. An arrow (e.g., D5) is shown between the sensor 62a and a data element 110e (that may be located on the vehicle 50b). An arrow (e.g., D4) is shown between the sensor 62a and the infrastructure element 70d. The arrow D4 represents a polar distance to the element 70d. Since the infrastructure element 70n is not detected in the example shown, an arrow D2 is not shown. An angle (e.g., A1) is shown between the arrow D1 and a line of sight arrow D0 of the vehicle 50a. An angle (e.g., A3) is shown between the arrow D3 and the arrow D0. An angle (e.g., A4) is shown between the arrow D0 and the angle D4. An angle (e.g., A5) is shown between the arrow D0 and the arrow D5.

Figure 4:
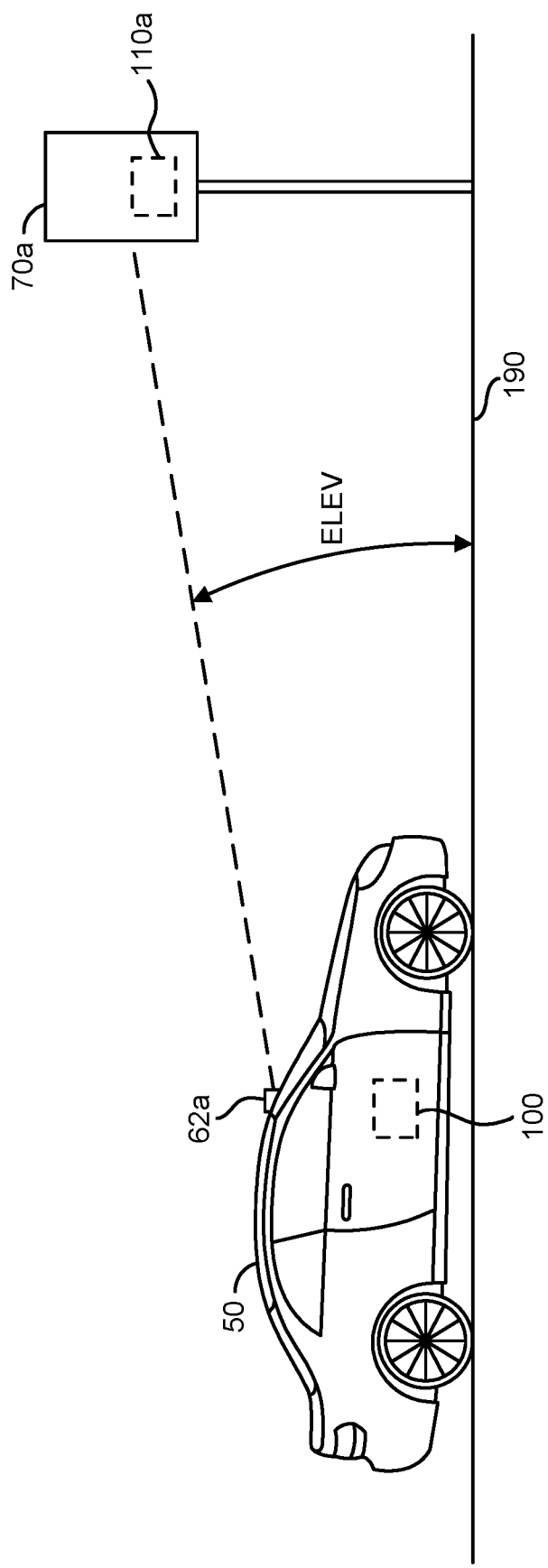
FIG. 4 is a diagram of a side view of a vehicle.

Referring to FIG. 4, a block diagram illustrating a side view of a vehicle 50 is shown. The vehicle 50 is shown having a sensor 62a. The sensor 62a may read the information from the data element 110a. The sensor 62a is shown located on a top portion of the vehicle 50. However, the particular location of the sensor 62a may be varied to meet the decision criteria of a particular implementation. The data element 110a is shown positioned on the infrastructure element 70a. An angle (e.g., ELEV) is shown that generally represent an angle from an elevation of the road 190 to the infrastructure element 110a. While the angle ELEV is shown pointing to a generally center portion of the infrastructure element 70a, the angle ELEV may be determined by the processor 102 based on information stored in the data element 110a.

Figure 5:
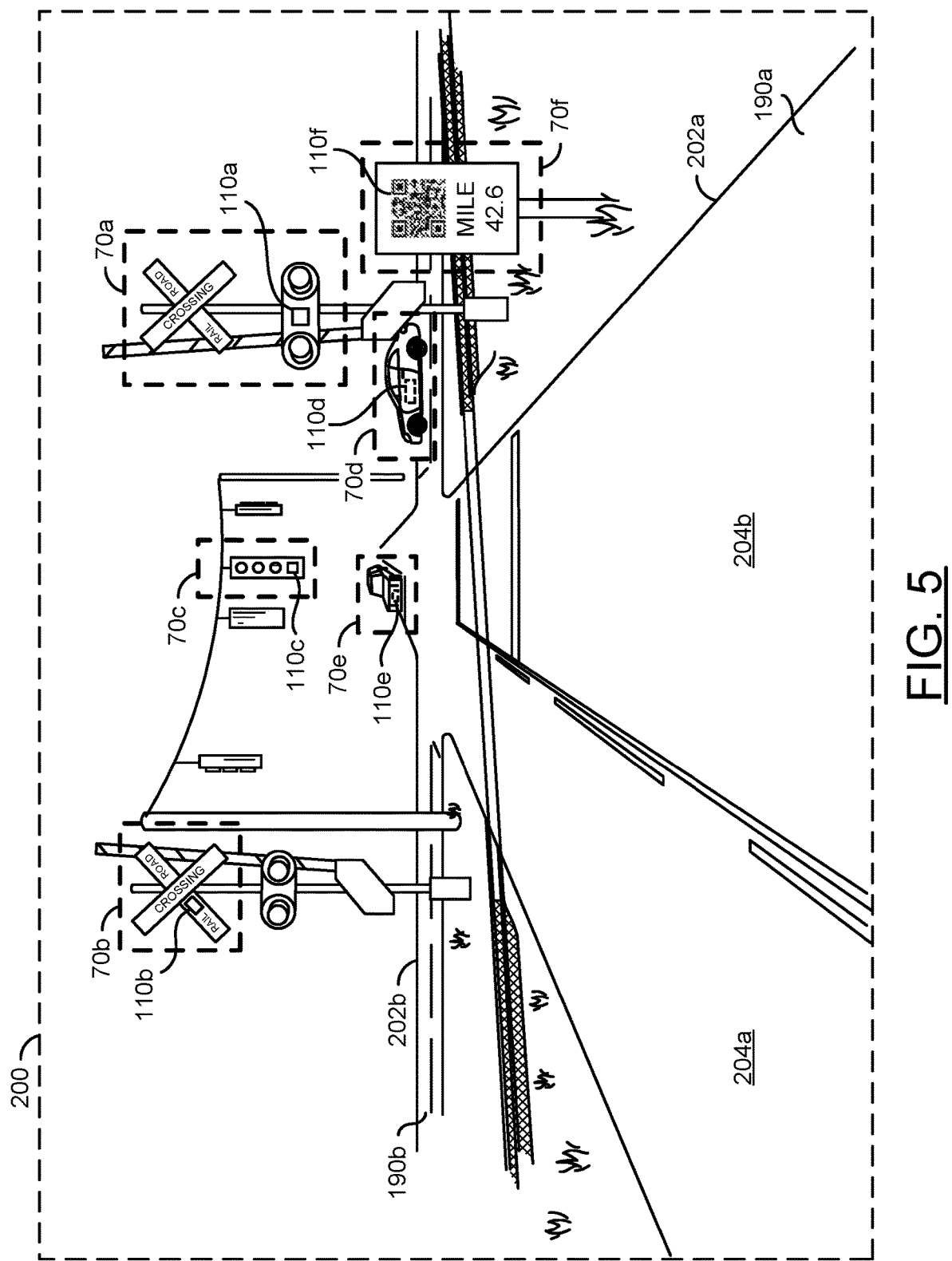
FIG. 5 is a diagram of a perspective view from a drivers location.

Referring to FIG. 5, a block diagram illustrating a perspective view 200 from a drivers location is shown. The perspective view 200 shows a number of elements 70a-70f. The road 190a is shown having a side marker 202a, a road lane 204a, and a road lane 204b. An intersecting road 190b is shown having a side marker 202b. The elements 70a-70n may be infrastructure elements or other elements that may have one of the data elements 110a-110n. The element 70a may be a road marking. The element 70b may be a road marking. The element 70c may be a stoplight. The element 70d may be a vehicle. The element 70e may be a vehicle. The element 70f may be a road marking. In the example shown, the elements 70a-70f may each have an encoded element 110a-110n. The infrastructure element 70f is shown with a QR code 120f. A plurality of data elements 70a-70n may be used to implement continual localization.

Referring to FIG. 6, a block diagram illustrating an example implementation of the encoded data set 110a is shown. The encoded data set 110a generally comprises a number of data elements 252a-252n. The data element 252a may be implemented as a location coordinate. The data element 252b may be implemented as a beacon identifier. The data element 252c may be implemented to provide information about nearby beacon locations. The data element 252d may provide information about the roadway. The data element 252e may provide information about driving instructions. The data element 252f may be an update link. The data element 252n may provide other information.

The data element 252a may store information about a GPS coordinate. An accurate GPS coordinate for a particular sign 70a-70n may be stored. The GPS coordinate may be calibrated when a particular sign 70a-70n is installed. The GPS information read from a particular one of the signs 70a-70n has zero (or little) error. The data element 252b and 252c may store information about the position of the next one of the signs 70a-70n on the same road 190a. Such information may improve vision detection performance. The data element 252d may share information about a lane marker or road edge information. Information about curvature, heading angle, lateral displacement information of the lane markers, and other road edges in the area may also be provided.

The data element 252d may also store information about the road 190, such as number of lanes, lane width, lane assigned driving direction, lane assigned turning direction, etc. The data element 252d may also provide information about which of the lane the host vehicle is currently driving in and which of the lanes 204a-204n the host vehicle 50 is supposed to drive in in order to turn left or right in the next intersection. The data element 252d may also provide information about an intersection (e.g., between the road 190a and the road 190b). Such intersection information may inform the host vehicle 50 which lane of the lanes 204a-204n to drive in to turn left, etc. For example, an intersection sign 70a may contain not only the information about the road 190a, but also information of an intersection with the road 190b. The data element 252f may provide a link to connect to an internet location (e.g., a VRL) so the sensor 108 can download the latest sign information. The data element 252a may provide other data.

The various road signs may be designed to have specific markings that may be interpreted by the processor 102 as a binary data. Information such as (i) a GPS coordinate of the sign, (ii) traffic lane information near the sign, etc. may be included. The processor 102 may be able to read the encoded contents of the signs 70a-70n to determine a polar range, azimuth angle, and/or the elevation to the detected sign. The processor 102 may calculate a GPS coordinate according to the available information.

The processor 102 may be implemented to operate with one or more of the vision sensors 62a-62n to read encoded data from one or more of the signs 70a-70n. Implementing a sign with a known data structure and/or known infrastructure shape may improve the performance of environment perception. However, the particular structure and/or infrastructure shape may be varied to meet the design criteria of a particular implementation. Reading specific information about one or more signs 70a-70n may also decrease the need to rely on current Lidar localization approaches. Reading the signs 70a-70n may operate in the absence of Lidar, or in a fault condition of Lidar. Such approaches need to operate in spite of un-defined and/or complicated environment scenarios. In an example, the signs 70a-70n may be implemented with specific texture which may be read and/or interpreted by the computer vision in the processor 102. A QR code is one example of how to encode data. Other encoded data structures may be implemented to meet the design criteria of a particular implementation.

In an example implementation, the processor 102 may detect signs 70a-70n within a range of about 200 meters during day and night. In a night implementation, the signs 70a-70d may be illuminated with headlights of the vehicle 50. In an example, the signs 70a-70n may be placed every 200 meters on a straight highway. The distance interval of the signs 70a-70n may be smaller for a local road or for a curved road. The signs 70a-70n may be placed before each intersection so that the vehicle 50 can determine an exact position to turn to another road. Two signs may be placed laterally at each side of the road at the same longitudinal (in the perspective of the road heading) intervals. Such placement may improve vision performance of the processor 102 to determine lateral offset of the host vehicle on the road.

The particular size and/or shape of the sign texture and/or the signs 70a-70n (or mounting infrastructure) may be standardized to improve the vision perception and/or performance. If the processor 102 knows how big and/or how tall to expect the structure of a particular one of the signs 70a-70n, it will generally be easier for an image processing system to determine the distance and/or the angle to the particular sign. In an example, one or more of the signs 70a-70n may be drawn on a spheroidal structure so that the sign structure can be seen by the vision sensor 62a from a variety of different azimuth angles. The vision processing of the processor 102 is normally able to recognize and/or interpret data in the range of <25 ms. The processing of the processor 102 may utilize the stereo vision to improve longitudinal and/or lateral sign perception performance.

The following scenario shows how the processor 102 of the host vehicle 50 may calculate a position (e.g., [xHOST, yHOST]) after recognizing the sign SIGN1, the sign SIGN3 and the sign SIGN4. In the example described, the sign SIGN2 is out of a field of view of the system.

The sign SIGN1 is shown having a coordinate [x1, y2], a polar distance (e.g., D1) and an azimuth angle (e.g., A1). The sign SIGN3 is shown having a coordinate [x3, y3], a polar distance (e.g., D2), and an azimuth angle (e.g., A3). The sign SIGN4 is shown having a coordinate[x4, y4], a polar distance (e.g., D4) and an azimuth angle (e.g., A4). The coordinates for each of the sign SIGN1, the sign SIGN3 and/or the sign SIGN4 are generally a coordinate the vision system reads from the data 110a-110n of the respective signs 70a-70n. The polar distance and azimuth angle may be calculated by the processor 102.

The coordinate [xHOST, yHOST] of the host vehicle 50 may be calculated from the information of the sign SIGN1 as follows:

$$xHOST = x1 ]x1*\sin(distToSign1)$$

$$yHOST = y1 ]y1*\cos(distToSign1)$$

The coordinate [xHOST, yHOST] of the host vehicle 50 may be calculated from information read from the sign SIGN3 and/or the sign SIGN4. The final result of the coordinate of the host vehicle 50 may be a blend of the host coordinates calculated from all of the signs 70a-70n according to their recognition confidences. The position of the host vehicle 50 may also be predicted according to a previous position and/or state. A self-predicted position and the position calculated by the sign recognition performed by the processor 102 may be blended again in order to improve performance.

A GPS Navigation System may include sign data detailed map data as well as information of all of the sign positions. Map data and/or sign data may be used to improve the localization performance. With access to map data, even if the vision system misses some of the signs 70a-70n, the processor 102 may estimate the missing information according to the map data, previously recognized sign data and/or self-motion prediction.

The budget to install signs may be relatively small. The encoded data may be placed on existing signs, or may be placed on new signs. Defined sign data structure and/or sign infrastructure shape may make the vision process more efficient to detect and/or percept the information. A variety of information may be put into each of the signs 70a-70n.

Detection of the signs 70a-70n may not be as accurate in bad weather conditions. The vision process may incorporate redundancy to help in such conditions. For example, sign recognition may be supplemented by V-to-I communication between sign infrastructure elements 70a-70n and/or the vision sensor 62a. In such an example, the sign infrastructure elements 70a-70n do not generally have any texture, but will have a specific device which may communicate with the vision sensor 62a in order to tell the sensor the information described. In this case, machine vision may be designed for only detecting the polar range, azimuth angle and/or vertical angle to the sign structure 70a-70n.

A point to point distance sensing system may be used to allow the host vehicle 50 to localize itself more accurately by using the V-to-I communication between the pre-installed devices and the host vehicle 50. In such a case, the pre-installed device may directly tell the host the distance, angle, and/or elevation between itself and the vehicle 50. The communication device may also send the host vehicle 50 all of the various data described. This approach may provide all-weather sensing capability.

In an example, one or more of the signs 70a-70n on the rear and flank of a vehicle 50. In such a case, instead of using the vision sensor to percept an object shape in order to calculate information like longitudinal distance, lateral distance, object classification, the camera may percept pre-shaped signs on the vehicle to calculate the distance as well as the information such as the type of the vehicle, the width of vehicle, etc.

Since the signs 70a-70n on the objects are pre-defined, it will be much easier and accurate for the vision sensor to perceive it. If it is practically not possible to put QR code or signs on the vehicle (because of the cosmetic issue), markings which are only visible to the vision sensor 62 on the vehicle 50 may be implemented. For instance, an infrared image, etc. may be used.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
   an encoded data set configured to store a plurality of information relating to a surrounding area, wherein said encoded data set is presented in a vision sensor readable format along with human readable information on an infrastructure element; and
   an optical sensor configured to (i) locate and read said encoded data set and (ii) calculate a distance to said infrastructure element based on said information relating to said surrounding area, wherein (a) said distance is used to augment a current position of a vehicle with position information read from a second sensor to provide localization in an autonomous driving application and (b) said augmented position calibrates said position information read from said second sensor by generating a set of coefficients to transform data received from the optical sensor.

2. The system according to claim 1, wherein a GPS coordinate of said infrastructure element is calibrated and stored during installation of the infrastructure element.

3. The system according to claim 1, wherein said encoded data set comprises machine readable code.

4. The system according to claim 1, wherein said encoded data set comprises a QR code having a predefined size selected to allow reading by said sensor.

5. The system according to claim 4, wherein said QR code has a predefined size selected to allow reading during movement of an autonomous vehicle.

6. The system according to claim 1, wherein said encoded data set is positioned along with other infrastructure elements.

7. The system according to claim 1, wherein said optical sensor is implemented as a component of an autonomous vehicle.

8. The system according to claim 1, wherein said calculation is performed by a processor.

9. The system according to claim 8, wherein said information read from said second sensor comprises Advanced Driver Assistance Systems (ADAS) data.

10. The system according to claim 1, wherein said optical sensor includes an infrared sensor.

11. The system according to claim 1, wherein said information comprises distance to one or more infrastructure elements.

12. The system according to claim 1, wherein said information comprises angles to one or more infrastructure elements.

13. The system according to claim 1, wherein said human readable information comprises one or more road markings.

14. The system according to claim 1, wherein said information comprises information about nearby encoded data sets expected to be on other infrastructure elements.

15. The system according to claim 1, wherein a plurality of encoded data sets read from a plurality of infrastructure elements are used for continual localization.

16. The system according to claim 1, wherein said calibration of said position information comprises generating trend information to refine the calibration.

17. A system comprising:
   an encoded data set configured to store a plurality of information relating to a surrounding area, wherein said encoded data set is presented in a vision sensor readable format along with human readable information on an infrastructure element; and
   a sensor configured to (i) locate said encoded data set and (ii) calculate a distance to said infrastructure element based on said information relating to said surrounding area, wherein (a) said distance is used to provide localization in an autonomous vehicle application and (b) said information comprises information about nearby encoded data sets expected to be on other infrastructure elements.

18. The system according to claim 1, wherein said calculation is performed by a processor.

* * * * *